(12) United States Patent
Hsu

(10) Patent No.: US 6,561,083 B2
(45) Date of Patent: May 13, 2003

(54) GRILL AND CAGE OF ELECTRIC OVEN

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/947,403

(22) Filed: Sep. 7, 2001

(65) Prior Publication Data

US 2003/0047552 A1 Mar. 13, 2003

(51) Int. Cl.⁷ .................................................. A47J 37/04
(52) U.S. Cl. ....................................... 99/421 H; 99/427
(58) Field of Search ............................... 99/427, 421 H, 99/421 HH, 419, 426, 450

(56) References Cited

U.S. PATENT DOCUMENTS 4,555,986 A * 12/1985 Eisenberg .................... 99/427
6,220,152 B1 * 4/2001 Baldwin et al. ............... 99/427
6,425,318 B1 * 7/2002 Kim ......................... 99/427 X
6,450,087 B2 * 9/2002 Backus et al. ................ 99/427

* cited by examiner

Primary Examiner—Reginald L. Alexander
(74) Attorney, Agent, or Firm—Rosenberg, Klein & Lee

(57) ABSTRACT

A structure of a grill and a cage separately for an electric oven, characterize by a gear fitted on either outer side of the grill/cage, a rotating shaft passing through the oven being respectively fixed to the outer side the gear and the other outer side of the grill/cage; the grill comprised of two turntables with one having an insertion rod at its center and the other having an insertion hole are fixed to each other and secured with a wing bolt adapted to the outer side of the another turntable; and a partition being provided on the inner wall of the cage protruding toward the center of the cage.

2 Claims, 6 Drawing Sheets

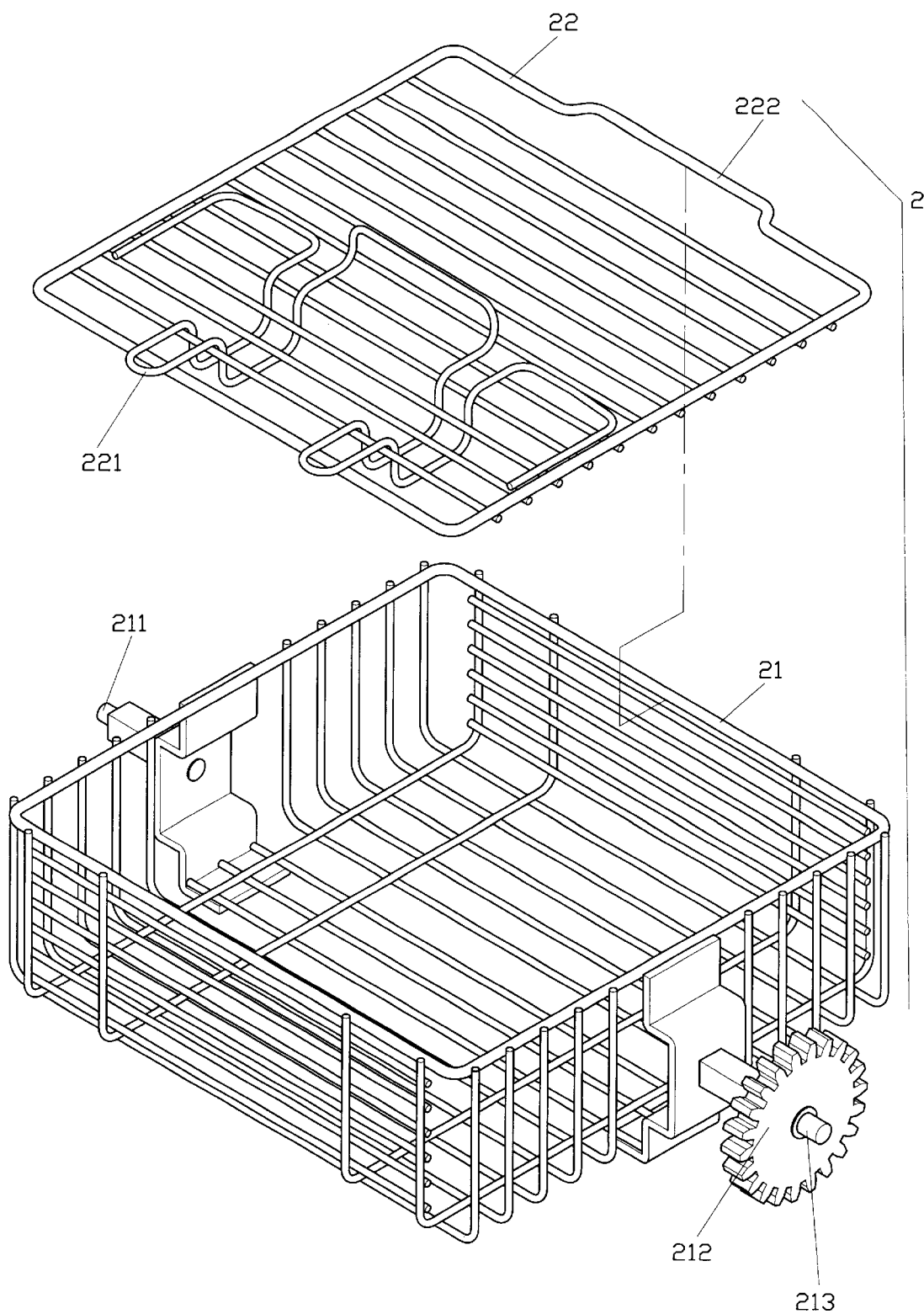
F I G . 3

GRILL AND CAGE OF ELECTRIC OVEN

BACKGROUND OF THE INVENTION (a) Field of the Invention

The present invention relates to a structure of a grill and cage for an electric oven, and more particularly to one adapted to the oven with a turning grill/cage driven by a motor.

(b) Description of the Prior Art

Whereas the prior art of a grill/cage of an electric oven, such as disclosed in U.S. Pat. Nos. 6,076,453, 6,142,064, 6,173,645, 6,240,838, 6,250,214 and 6,253,665, is essentially composed of a grill including two pans and one or two insertion rod. Said pans are combined with the insertion rod with a turning shaft provided to the outer side of the pan or at both ends of said insertion rod to turn around inside the oven. When in use, food is pierced through with the insertion rod before combining the pans and the insertion rod. However, they share the same defective that the food is not secured enough by the insertion rod, thus a consistent rotation is prevented. An even greater flaw is that if a cage is used, the grill must be inserted into the cage for use. Usually, more than one type of food is prepared, the operation of the cage and grill becomes not so convenient. In addition, the cage is not fixed in relation to the grill, resulting in insufficient strength of the cage and the grill as a whole, the rotation is vulnerable to be deflected. Lateral sliding of the cage also creates unnecessary noise. The absence of a partition in the case makes the food of smaller size receives uneven heats or gets overdone.

SUMMARY OF THE INVENTION

The primary purpose of the present invention is to provide a grill and cage structure for an electric oven. A gear is fixed to one side of the grill or cage and a turning shaft is each fixed to the outer side of the gear and that of the other side on the grill or the cage. Said turning shafts are inserted inside the oven and said grill comprises two turntables. An insertion rod is provided to the center of one turntable and a corresponding insertion hole is provided in the center of the other turntable. A wing bolt is connected to the outer side of the other turntable to secure both turntables in position when incorporated with the insertion rod placed into the insertion hole. Furthermore, a partition is provided inside the cage protruding toward the center of the cage to eliminate restriction to the variety of the food when the oven is in use.

BRIEF DESCRIPTION OF THE DRAWINGS

FIG. 3 is an exploded view of a square cage of the present invention.

DETAILED DESCRIPTION OF THE PREFERRED EMBODIMENTS

Figure 1:
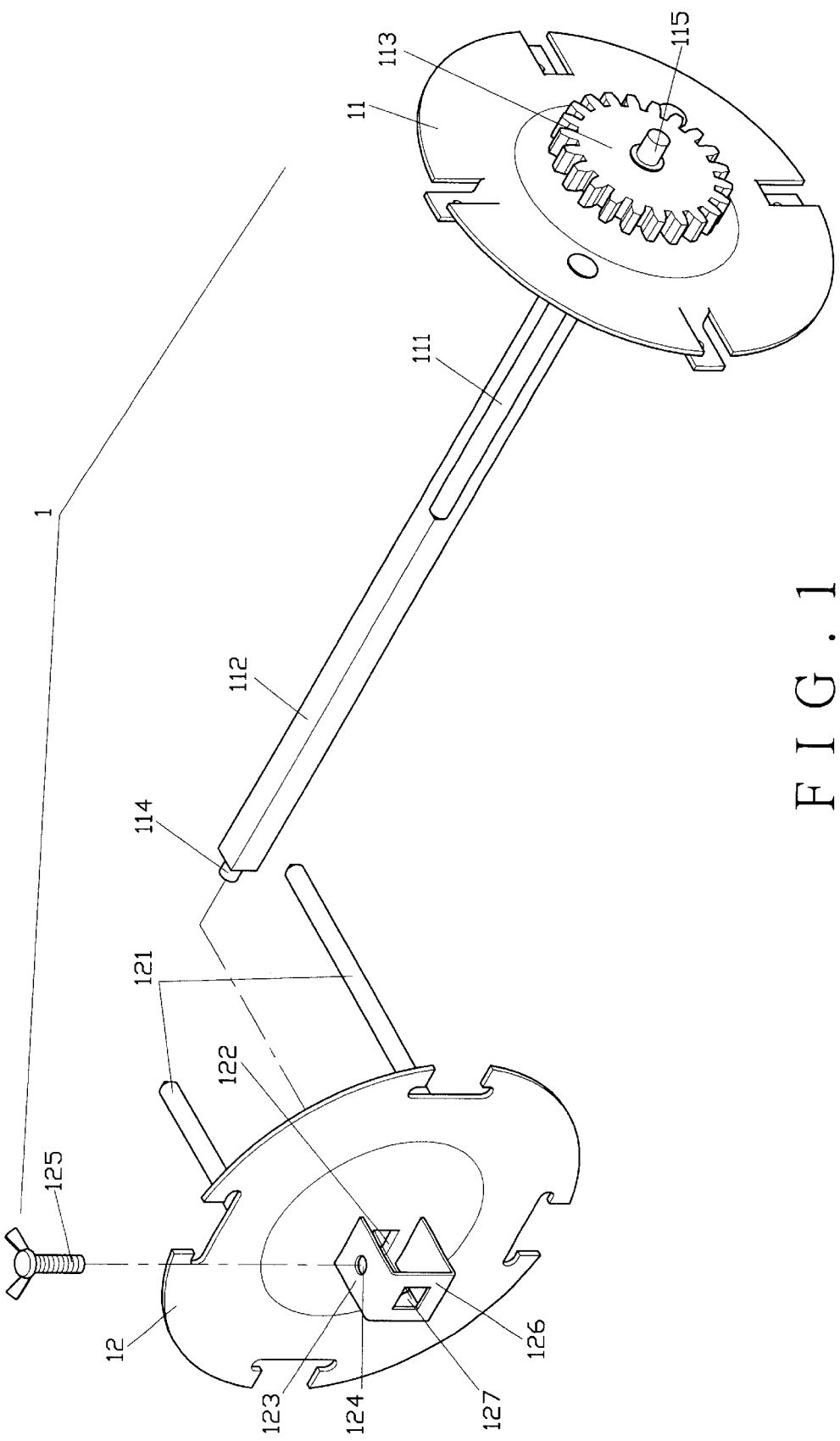
FIG. 1 is an exploded view of a grill of the present invention.
Figure 2:
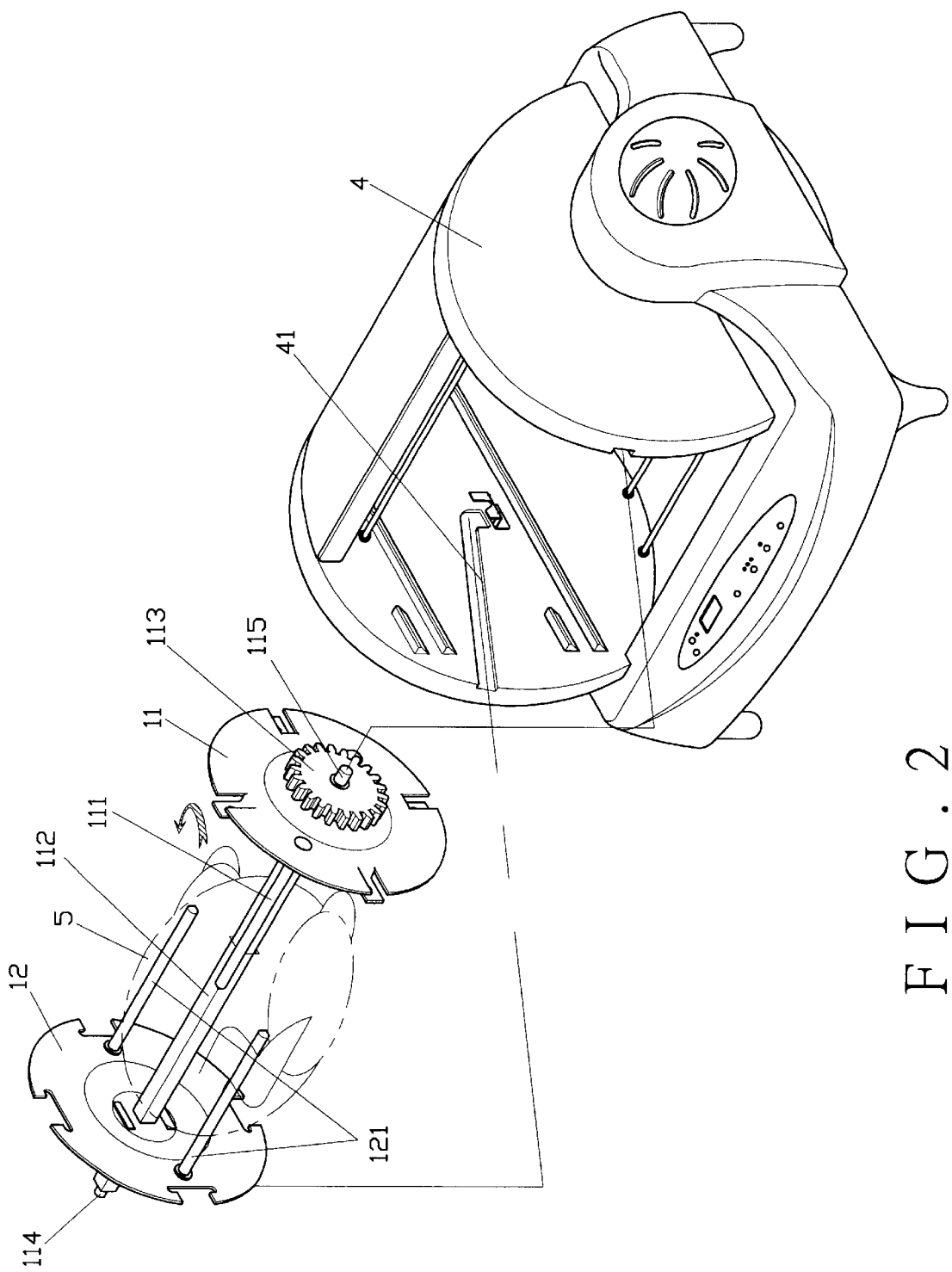
FIG. 2 is a view showing a preferred embodiment of the grill of the present invention.

Referring to FIGS. 1 and 2, a preferred embodiment of the grill (1) of the present invention is composed of two turntables (11, 12) and two rods (111, 121) respectively provided to the two turntables (11, 12). Both side panels of an oven (4) are each provided with a guide groove (41) at a certain inclination.

An insertion rod (112) is provided at the center of the turntable (11) penetrating through the turntable (11) and fixed to a gear (113). Two turning shafts (114, 115) are each respectively fixed to the outer side of the gear (113) and to the other end of the insertion rod (112). An insertion hole (122) corresponding to the insertion rod (112) is provided in the center of the turntable (12). A bracket (123) is provided to the outer side of the turntable (12). A hole (124) in the bracket (123) is provided to receive a wing bolt (125). The bracket (123) extends downward a bending plate (126) with an insertion hole (127) corresponding to the insertion rod (112). The insertion rod (112) from the turntable (11) is inserted into the insertion hole (127) and secured in place by tightening up the wing bolt (125) through the bracket (123) for both turntables (11, 12) to fix to each other. In practice, the rods (111, 121) and the insertion rod (112) with the food on are put together and the turning shafts (114, 115) are placed into the guide grooves (41) of the oven (4).

Figure 4:
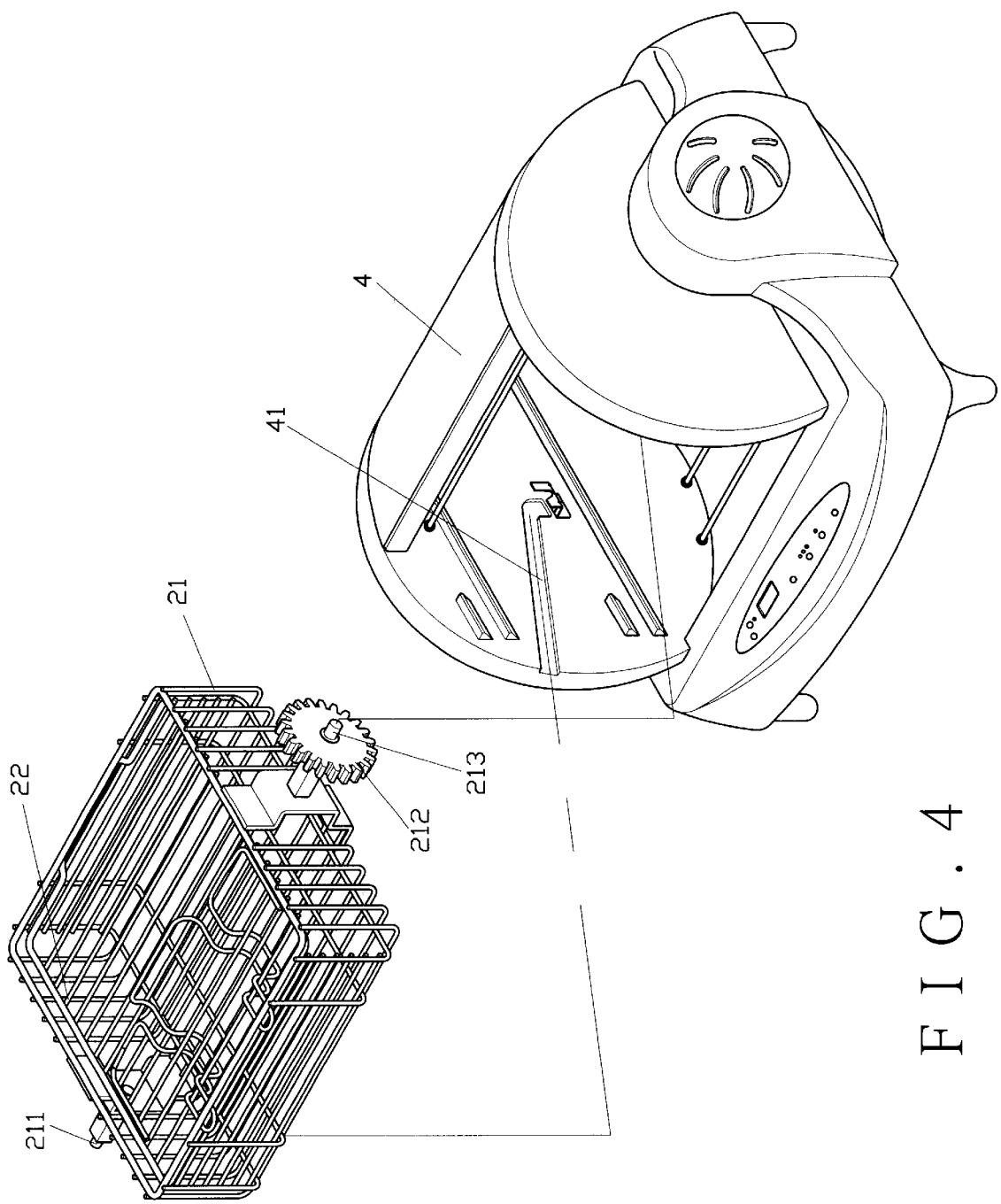
FIG. 4 is a view showing a preferred embodiment of the square cage of the present invention.
Figure 5:
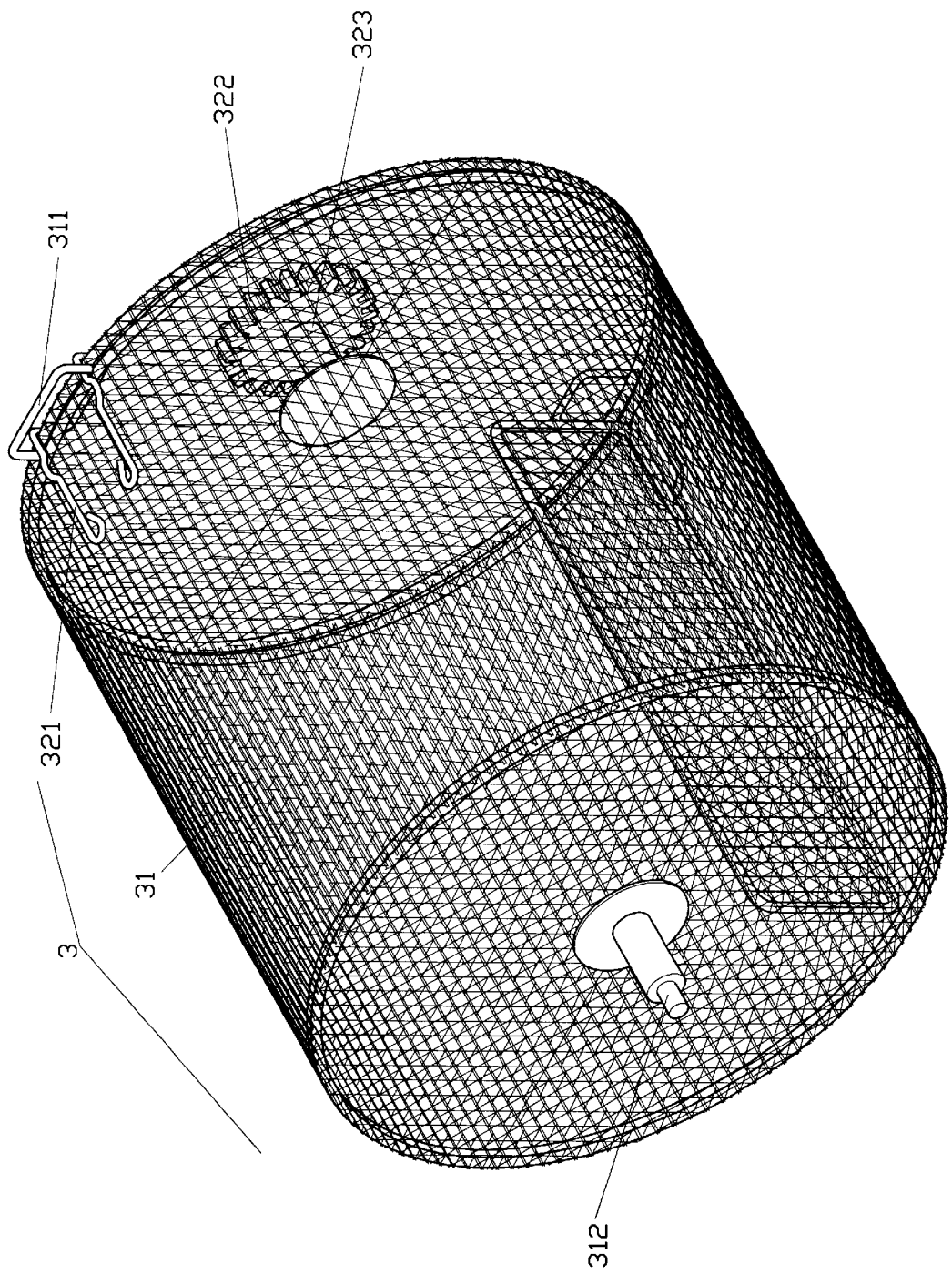
FIG. 5 is a view showing a circular cage of the present invention.
Figure 6:
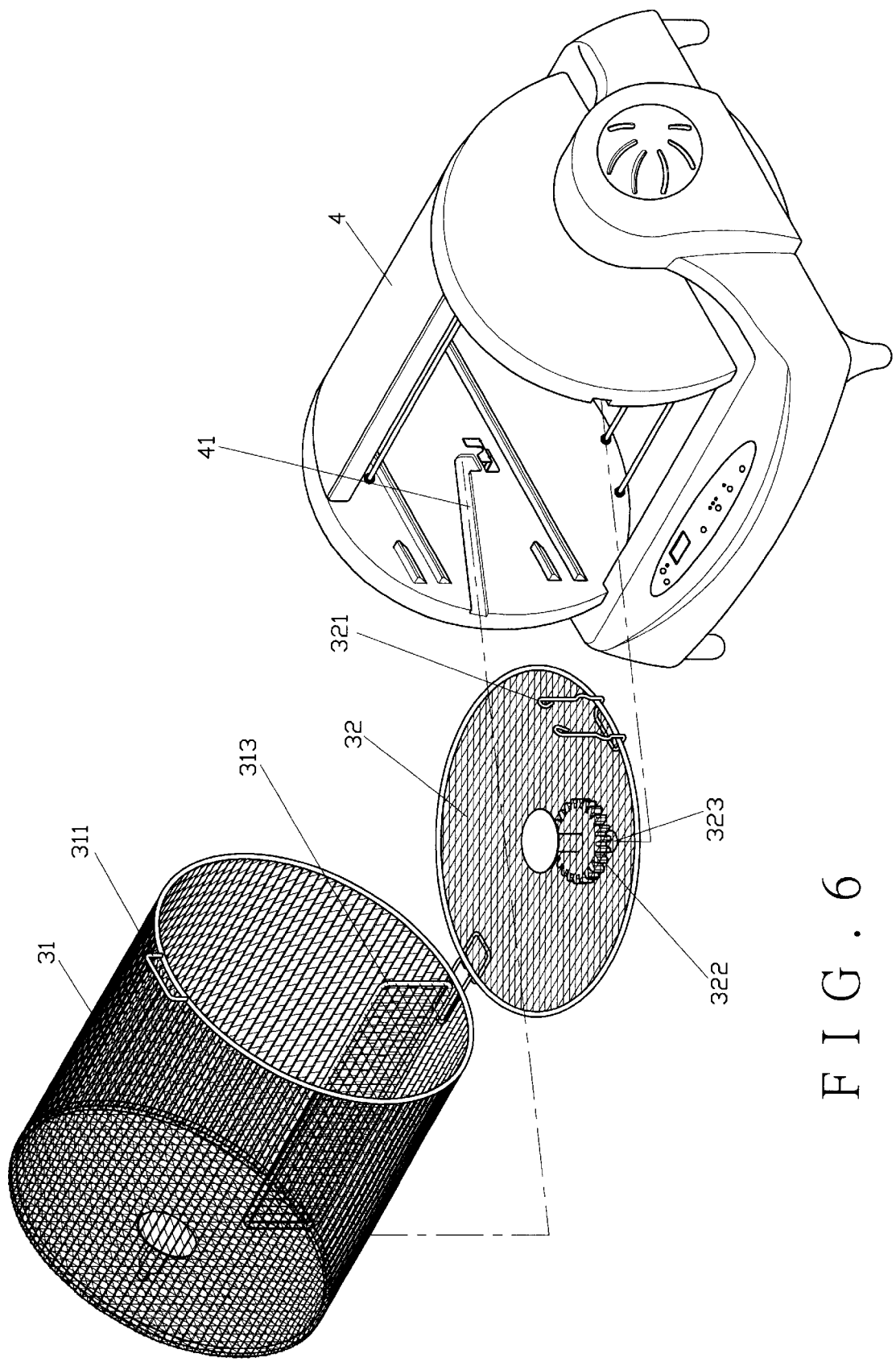
FIG. 6 is an exploded view of a preferred embodiment of the circular cage of the present invention.

As illustrated in FIGS. 3 and 4, a cage of the present invention can be made in square and in circular. The square cage (2) comprises a main portion (21) and a cover (22). The cover (22) is fixed to the main portion (21) with a snap (221) and a handle (222). A turning shaft (211) is fixed to the one side of the main portion (21) and a gear (212) is fixed to the other side of the turning shaft (211). Another turning shaft (213) is fixed to the outer side of the gear (212). In use, the turning shafts (211, 213) are inserted into the guide grooves (41) in the oven FIGS. 5 and 6 show another preferred embodiment of the circular cage (3). The circular cage (3) comprises a main portion (31) and a cover (32). The main portion (31) is covered up by the cover (32), and a turning shaft (312) is fixed to the outer side of the main portion (31). A turning shaft (312) is fixed to the outer side of the main portion (31) and a bolting ring (311) is provided on the edge of the opening end of the main portion (31) opposite to the turning shaft (312). A partition (313) protruding toward the center inside the main portion (31) is provided on the inner wall of the main portion (31). A snap (321) provided on the outer edge of the cover (32) locks up the bolting ring (311) for the cover (32) to cover up the main portion (31). A gear (322) is fixed to the outer side of the cover (32) and a turning shaft (323) is fixed to the outer side of the gear (322). In practice, both of the turning shafts (312, 323) are inserted into the guide grooves (41) of the oven (4).

As disclosed above, either in the grill (1), square cage (2) or circular cage (3), the present invention has provided turning shafts on both ends of the main portion, and a gear on one side. Said cage and grill can be separately used. The structure offers better strength as a whole because that the relative locations among all members are fixed without restricting the practical use of the oven. It also warrants consistent rotation of the grill and cage, and the partition (313) in the circular cage (3) helps even distribution of heats to the food.

I claim:

1. An electric oven having a grill structure, comprising:

said electric oven having a pair of opposing side panels with a guide grove respectively formed therein, each of said guide grooves being disposed at a predetermined inclination; and, said grill having a gear fixed to a first of a pair of opposing ends thereof, said gear having a first turning shaft extending therefrom, a second of said pair of opposing ends having a second turning shaft extending therefrom, said first and second turning shafts being respectively received in said guide grooves of said electric oven, said grill including two turntables respectively disposed at said first and second ends, each of said turntables being provided with two rods extending from a surface thereof, a first of said turntables having an insertion rod passing through a center thereof and fixed to said gear, said first turning shaft being fixed to an outer side of said gear and said second turning shaft being fixed to an end of said insertion rod, a second of said turntables having an insertion hole formed through a central portion thereof in correspondence with said insertion rod, said second turntable having a bracket coupled to an outer side thereof, said bracket having a screw hole formed therein to receive a wing bolt, said two turntables being fixed to each other by placing said insertion rod from said first turntable into said insertion hole of said second turntable and securing said insertion rod with said wing bolt.

2. The electric oven having a grill structure as claimed in claim 1, wherein said bracket of said second turntable has a downwardly extending bending plate with a second insertion hole formed therethrough in correspondence with said insertion rod.

* * * * *